US011920741B2

(12) United States Patent
Pan et al.

(10) Patent No.: US 11,920,741 B2
(45) Date of Patent: Mar. 5, 2024

(54) WATERPROOF CORE COLUMN ASSEMBLY

(71) Applicant: Haining Xincheng Electronics Co., LTD., Jiaxing (CN)

(72) Inventors: Jianxin Pan, Jiaxing (CN); Zhenqiang Wu, Jiaxing (CN); Fajun Tu, Jiaxing (CN)

(73) Assignee: Haining Xincheng Electronics Co., Ltd, Jiaxing (CN)

( * ) Notice: Subject to any disclaimer, the term of this patent is extended or adjusted under 35 U.S.C. 154(b) by 0 days.

(21) Appl. No.: 17/891,228

(22) Filed: Aug. 19, 2022

(65) Prior Publication Data

US 2024/0003502 A1 Jan. 4, 2024

(30) Foreign Application Priority Data

Jun. 30, 2022 (CN) ......................... 202221676511.1

(51) Int. Cl.

*F21V 31/00* (2006.01)
*F21K 9/232* (2016.01)
*F21K 9/237* (2016.01)
*F21Y 103/10* (2016.01)
*F21Y 115/10* (2016.01)

(52) U.S. Cl.

CPC .............. *F21K 9/237* (2016.08); *F21K 9/232* (2016.08); *F21V 31/005* (2013.01); *F21Y 2103/10* (2016.08); *F21Y 2115/10* (2016.08)

(58) Field of Classification Search

CPC ........ F21K 9/237; F21K 9/232; F21V 31/005; F21Y 2103/10; F21Y 2115/10
See application file for complete search history.

(56) References Cited

U.S. PATENT DOCUMENTS

| | | | | |
|---|---|---|---|---|
| 11,293,596 | B1 * | 4/2022 | Wang | F21K 9/238 |
| 11,293,599 | B1 * | 4/2022 | Wang | F21V 31/005 |
| 2017/0276298 | A1 * | 9/2017 | Liu | F21K 9/232 |
| 2019/0323695 | A1 * | 10/2019 | Wu | F21V 23/003 |
| 2022/0136660 | A1 * | 5/2022 | Huang | F21K 9/232<br>362/363 |

* cited by examiner

*Primary Examiner* — Evan P Dzierzynski

(57) ABSTRACT

A waterproof core column assembly includes a sealed support, a guide wire and light bars, where two filament channels penetrating through a top surface and a bottom surface are vertically arranged in the sealed support, the guide wire penetrates through the filament channels, a plurality of light bars are connected by the guide wire and are all located below the sealed support, and a plurality of resistors or current regulative diodes are integrated in the light bars. The waterproof core column assembly integrates a plurality of resistors or current regulative diodes in the light bars besides the light source and the rectifier bridge, which can transfer the resistors from the upper part of the sealed support to the lower part of the sealed support and enclose them in a lamp cap, so as to fundamentally prevent the connection point between the resistors and the guide wire from being exposed.

16 Claims, 5 Drawing Sheets

WATERPROOF CORE COLUMN ASSEMBLY

CROSS REFERENCE TO THE RELATED APPLICATIONS

This application is based upon and claims priority to Chinese Patent Application No. 202221676511.1, filed on Jun. 30, 2022, the entire contents of which are incorporated herein by reference.

TECHNICAL FIELD

The present invention relates to the technical field of lamp bulbs, in particular to the technical field of a waterproof core column assembly.

BACKGROUND

Lamp bulbs are the main lamps used by people for lighting. With the development of technology, all kinds of lamp bulbs have become very common, ranging from traditional tungsten filament bulbs to LED chip bulbs and LED light bar bulbs. The existing LED light bar bulb usually includes a bulb, a core column assembly and a lamp cap, where, the core column assembly includes a support seat, a guide wire, light bars and resistors, and a light source and a rectifier bridge are integrated in the light bars. As shown in FIG. 1, a resistor d is usually installed in the support seat a and connected with the light bar c through the guide wire b, thus playing a current limiting role in the LED circuit, effectively avoiding the problem that the light bar c has a shortened working life or even burns out instantly due to long-term working in an excessive current environment. In addition, referring to FIG. 2, some manufacturers will choose to add a sleeve on the top of the support seat a to insert the resistor d, thus improving the convenience of the installation of the resistor d. However, in most cases, the LED light bar bulbs are installed with the bulb shell facing downwards, so the connection point M between the resistor d and the guide wire b is exposed to the outside and set upwards, which is easy to contact with the infiltrated rainwater, thus causing a short circuit phenomenon. Moreover, the infiltrated rainwater is not easy to discharge, and may accumulate on the top of the support seat a for a long time, further aggravating the above problems, which need to be solved urgently.

SUMMARY

The purpose of the present invention is to solve the problems in the prior art, and propose a waterproof core column assembly, which can fundamentally prevent the connection point of the resistor and the guide wire from being exposed, thus avoiding the short circuit phenomenon caused by water inflow. The overall structure is simple, the manufacturing cost is low, and it is very suitable for the use of outdoor lamp strings.

In order to achieve the above purpose, the present invention proposes a waterproof core column assembly, which includes a sealed support, a guide wire and light bars, where two filament channels penetrating through a top surface and a bottom surface are vertically arranged in the sealed support, the guide wire penetrates through the filament channels, a plurality of light bars are connected by the guide wire and are all located below the sealed support, and a plurality of resistors or current regulative diodes (CRDs) are integrated in the light bars.

Preferably, the sealed support includes a support column which is inserted downward and seals a top opening of a bulb shell.

Preferably, a bottom surface of the support column is provided with a flat guide part, and the flat guide part extends downward into an inner cavity of the bulb shell.

Preferably, a top edge of the support column is provided with an annular flange, and the annular flange is erected on the top opening of the bulb shell.

Preferably, convex cylinders are respectively provided on a top surface of the support column and above the two filament channels, and the guide wire penetrates through the barrel channels of the convex cylinders.

Preferably, the top edges of two convex cylinders are respectively provided with cylinder annular inclined planes.

Preferably, the top surface of the support column is provided with a lifting platform, and the two convex cylinders are both located on the lifting platform.

Preferably, a top edge of the lifting platform is provided with a platform body annular inclined plane.

Preferably, an inner wall of the filament channel is provided with a plurality of annular grooves from top to bottom, and each annular groove is provided with a waterproof rubber ring.

Preferably, the sealed support is a plastic support or a rubber support.

The present invention has the following advantages.

The present invention integrates several resistors or current regulative diodes in the light bars besides the light source and the rectifier bridge, which can transfer the resistors from the upper part of the sealed support to the lower part of the sealed support and enclose them in the lamp cap, so as to fundamentally prevent the connection point between the resistors and the guide wires from being exposed, thereby avoiding the short circuit phenomenon caused by water inflow and ensuring the normal operation of the bulb. Moreover, because the two filament channels in the sealed support can only be used for the guide wire to pass through, the size is small, the water-proof effect is better, the overall structure is simple, and the cost is high. By adding convex cylinders and a lifting platform on the top surface of the support column, the point where the guide wire extends into the channel is effectively raised, and rainwater is prevented from accumulating on the top surface of the support column and directly infiltrating into the filament channel; by respectively adding a cylinder annular inclined plane and a platform annular inclined plane on the convex cylinder and the lifting platform, the emptying of rainwater is accelerated; several annular grooves are sequentially arranged on the inner wall of the filament channel from top to bottom, and at the same time, water-proof rubber rings are respectively installed in each annular groove, so that rainwater can be effectively prevented from flowing down the filament channel into the bulb shell and affecting the normal work of all components.

The features and advantages of the present invention will be explained in detail with reference to the embodiments and the drawings.

in which 1—Waterproof core column assembly, 11—Sealed support, 111—Support column, 112—Flat guide part, 113—Annular flange, 114—Convex cylinder, 1141—Cylinder annular inclined plane, 115—Lifting platform, 1151—Platform body annular inclined plane, 12—Guide wire, 13—light bar, 2—Bulb shell, 3—Lamp cap, a—Support seat, b—Guide wire, c—Lamp bar, d—Resistor.

DETAILED DESCRIPTION OF THE EMBODIMENTS

Figure 1:
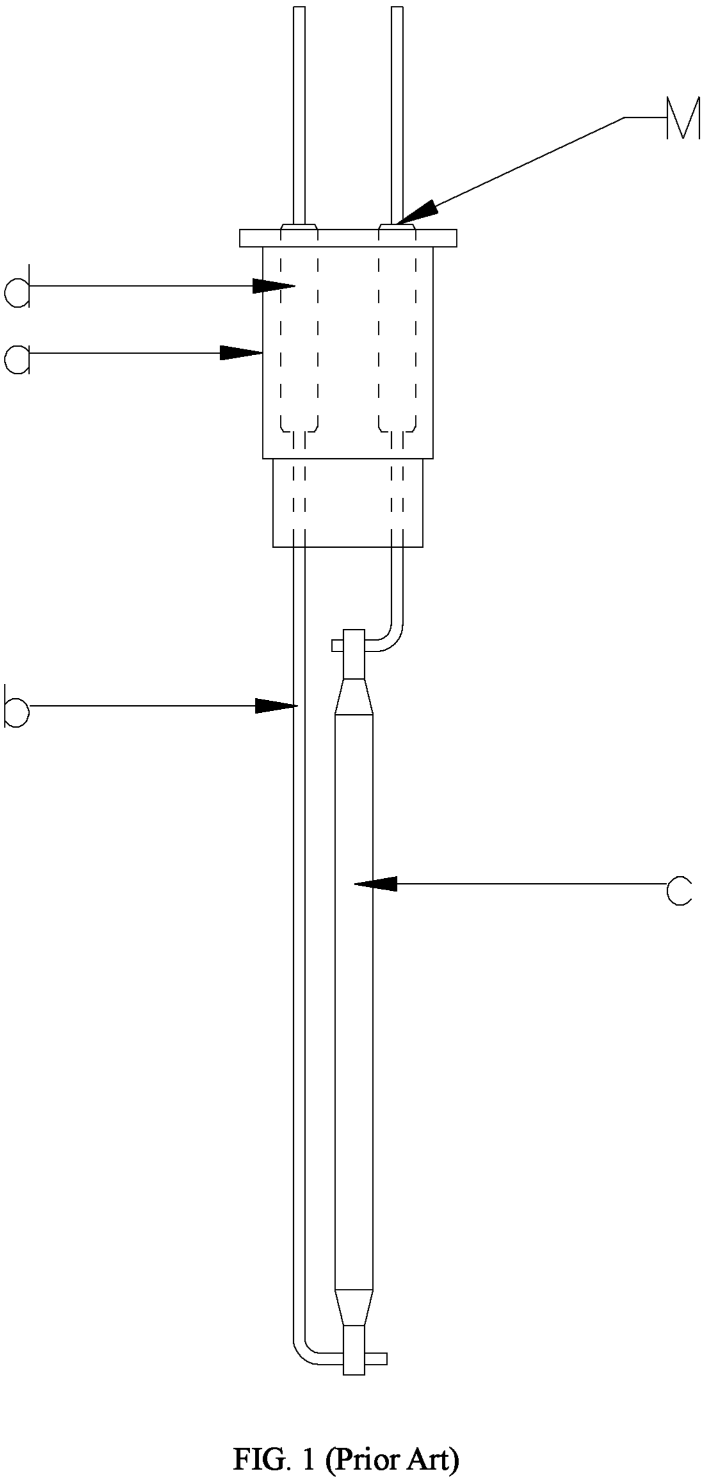
FIG. 1 (Prior Art)
FIG. 1 is a front view of an existing waterproof core column assembly.
Figure 2:
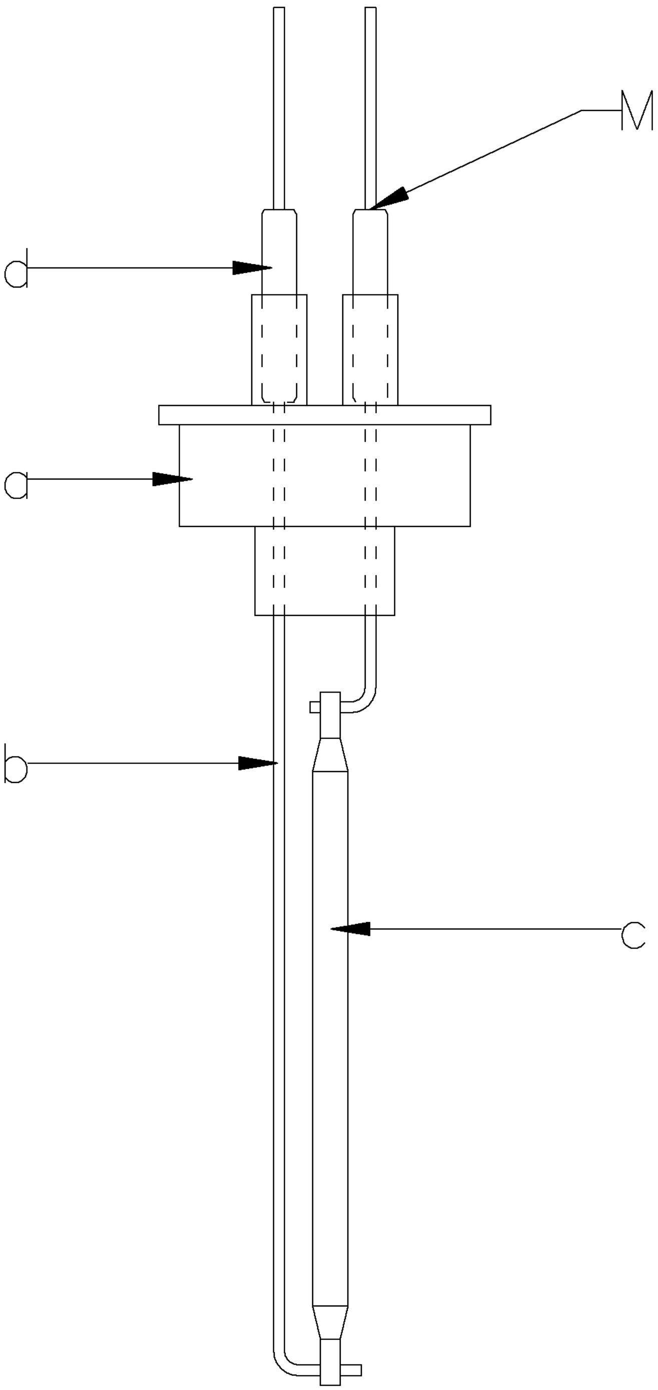
FIG. 2 (Prior Art)
FIG. 2 is a front view of another existing waterproof core column assembly.
Figure 3:
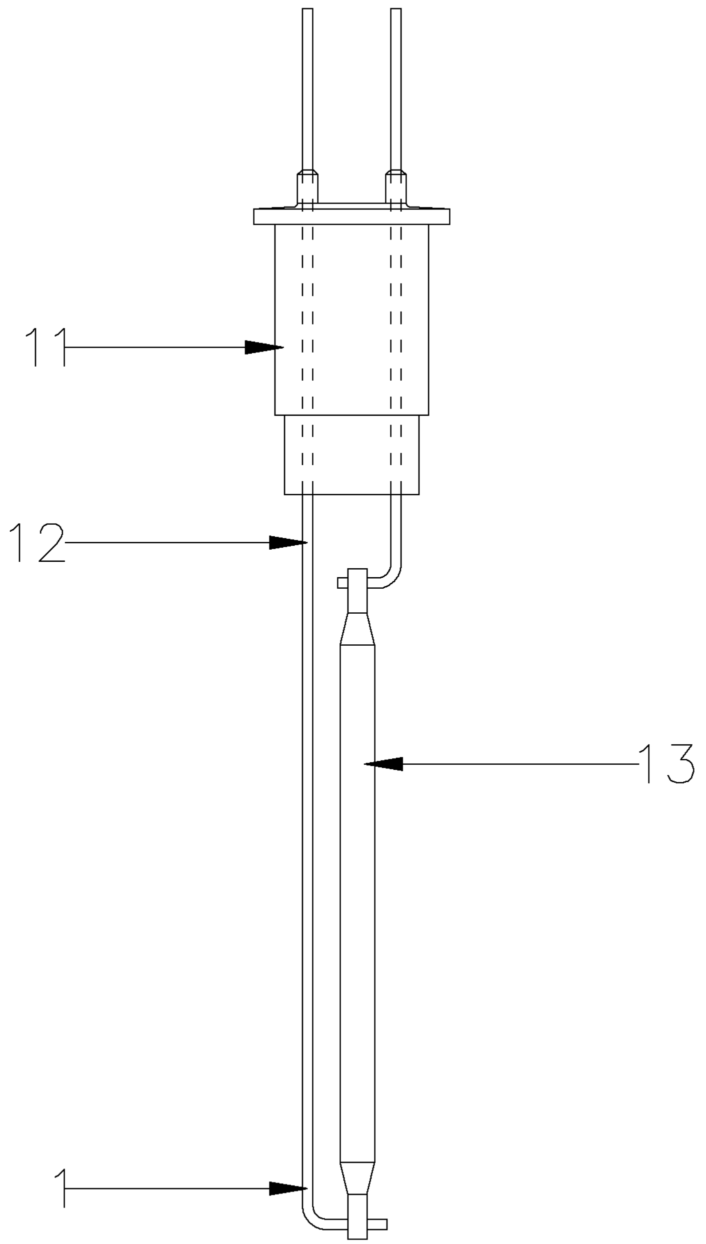
FIG. 3 is a front view of a waterproof core column assembly according to the present invention.
Figure 4:
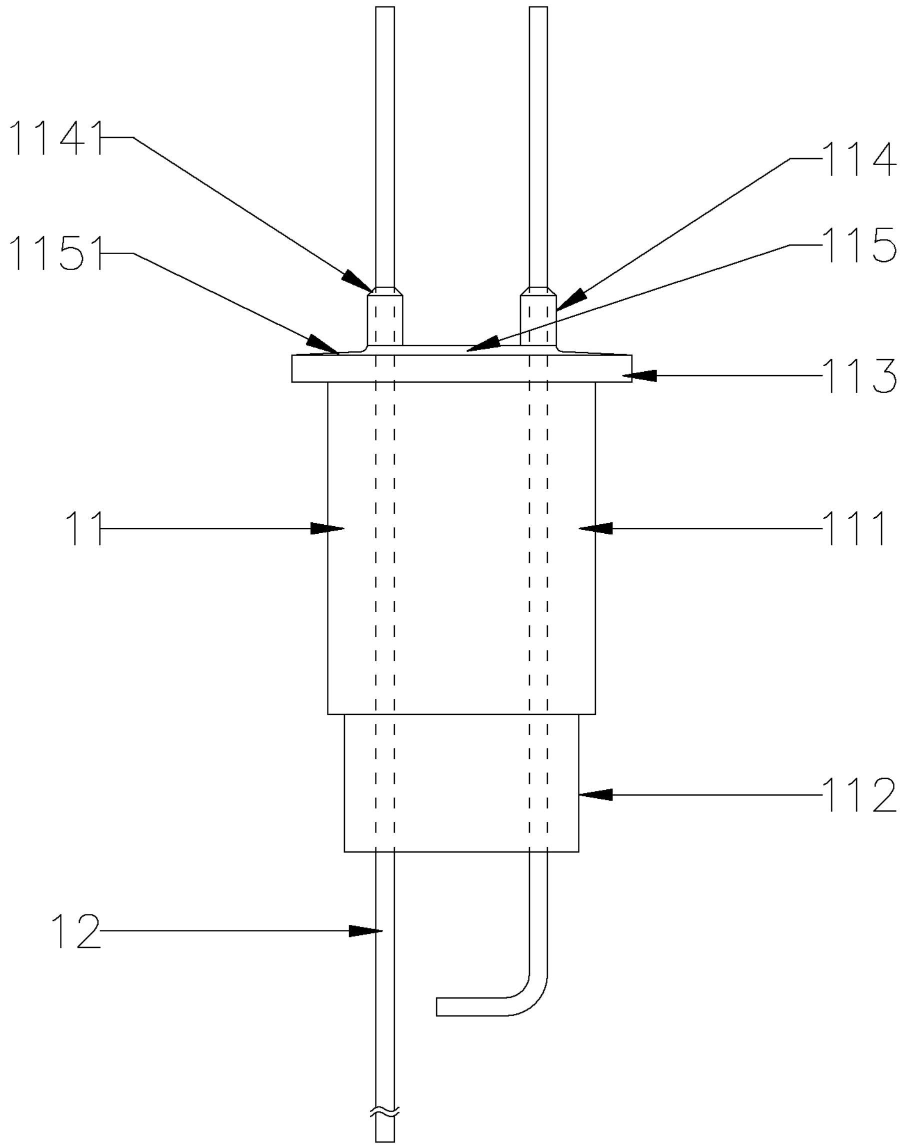
FIG. 4 is a schematic diagram of the connection between the sealed support and the guide wire of the waterproof core column assembly according to the present invention.
Figure 5:
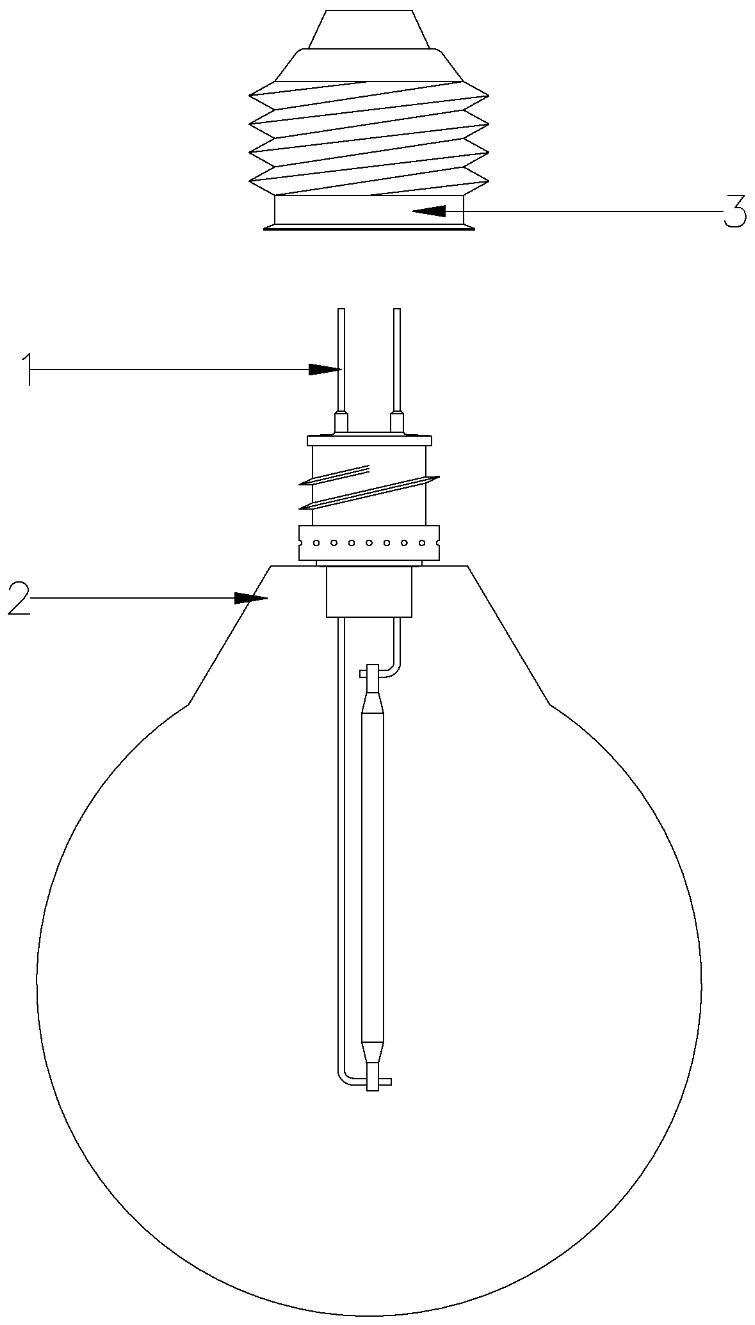
FIG. 5 is the assembly schematic diagram of a waterproof core column assembly according to the present invention.

Referring to FIG. 3 to FIG. 5, a waterproof core column assembly of the present invention includes a sealed support 11, a guide wire 12 and light bars 13, where two filament channels penetrating through a top surface and a bottom surface are vertically arranged in the sealed support 11, the guide wire 12 penetrates through the filament channels, a plurality of light bars 13 are connected by the guide wire 12 and are all located below the sealed support 11, and a plurality of resistors or current regulative diodes are integrated in the light bars 13.

The sealed support 11 includes a support column 111 which is inserted downward and seals a top opening of a bulb shell 2.

A bottom surface of the support column 111 is provided with a flat guide part 112, and the flat guide part 112 extends downward into an inner cavity of the bulb shell 2.

A top edge of the support column 111 is provided with an annular flange 113, and the annular flange 113 is erected on the top opening of the bulb shell 2.

Convex cylinders 114 are respectively provided on a top surface of the support column 111 and above the two filament channels, and the guide wire 12 penetrates through the barrel channels of the convex cylinders 114.

The top edges of two convex cylinders 114 are respectively provided with cylinder annular inclined planes 1141.

The top surface of the support column 111 is provided with a lifting platform 115, and the two convex cylinders 114 are both located on the lifting platform 115.

A top edge of the lifting platform 115 is provided with a platform body annular inclined plane 1151.

An inner wall of the filament channel is provided with a plurality of annular grooves from top to bottom, and each annular groove is provided with a waterproof rubber ring.

The sealed support 11 is a plastic support or a rubber support.

During installation, the support column 111 of the sealed support 11 is directly inserted downward to seal the top opening of the bulb 2, and then the guide wire 12 is connected with the lamp cap 3.

The present invention integrates several resistors or current regulative diodes in the light bar besides the light source and the rectifier bridge, which can transfer the resistors from the upper part of the sealed support to the lower part of the sealed support and seal them in the lamp cap, so as to fundamentally prevent the connection point between the resistors and the guide wires from being exposed, thereby avoiding the short circuit phenomenon caused by water inflow and ensuring the normal operation of the bulb. Moreover, because the two filament channels in the sealed support can only be used for the guide wires to pass through, the size is small, the water-proof effect is better, the overall structure is simple, and the cost is high. By adding a convex cylinder and a lifting platform on the top surface of the support column, the point where the guide wire extends into the channel is effectively raised, and rainwater is prevented from accumulating on the top surface of the support column and directly infiltrating into the filament channel; by respectively adding a cylinder annular inclined plane and a platform annular inclined plane on the convex cylinder and the lifting platform, the emptying of rainwater is accelerated; several annular grooves are sequentially arranged at the inner wall of the filament channel from top to bottom, and at the same time, water-proof rubber rings are respectively installed in each annular groove, so that rainwater can be effectively prevented from flowing down the filament channel into the bulb shell and affecting the normal work of all components.

The above embodiment is the explanation of the present invention, but not the limitation of the present invention. Any solution after simple transformation of the present invention belongs to the protection scope of the present invention.

What is claimed is:

1. A waterproof core column assembly, comprising a sealed support, a guide wire and light bars, wherein two filament channels are vertically arranged in the sealed support, wherein the two filament channels penetrate through a top surface and a bottom surface, the guide wire penetrates through the two filament channels, a plurality of light bars are connected by the guide wire and the plurality of light bars are located below the sealed support, and a plurality of resistors or current regulative diodes are integrated in the light bars;

wherein the sealed support comprises a support column, wherein the support column is inserted downward and the support column seals a top opening of a bulb shell;

wherein convex cylinders are respectively provided on a top surface of the support column and the convex cylinders are respectively provided above the two filament channels, and the guide wire penetrates through a barrel channel of one of the convex cylinders.

2. The waterproof core column assembly according to claim 1, wherein a bottom surface of the support column is provided with a flat guide part, and the flat guide part extends downward into an inner cavity of the bulb shell.

3. The waterproof core column assembly according to claim 2, wherein the sealed support is a plastic support or a rubber support.

4. The waterproof core column assembly according to claim 1, wherein a top edge of the support column is provided with an annular flange, and the annular flange is erected on the top opening of the bulb shell.

5. The waterproof core column assembly according to claim 4, wherein the sealed support is a plastic support or a rubber support.

6. The waterproof core column assembly according to claim 1, wherein a top edge of each of two convex cylinders is provided with a cylinder annular inclined plane.

7. The waterproof core column assembly according to claim 6, wherein the sealed support is a plastic support or a rubber support.

8. The waterproof core column assembly according to claim 1, wherein the top surface of the support column is provided with a lifting platform, and two convex cylinders are located on the lifting platform.

9. The waterproof core column assembly according to claim 8, wherein a top edge of the lifting platform is provided with a platform body annular inclined plane.

10. The waterproof core column assembly according to claim 9, wherein the sealed support is a plastic support or a rubber support.

11. The waterproof core column assembly according to claim 8, wherein the sealed support is a plastic support or a rubber support.

12. The waterproof core column assembly according to claim 1, wherein an inner wall of each of the two filament channels is provided with a plurality of annular grooves from top to bottom, and each of the plurality of annular grooves is provided with a waterproof rubber ring.

13. The waterproof core column assembly according to claim 12, wherein the sealed support is a plastic support or a rubber support.

14. The waterproof core column assembly according to claim 1, wherein the sealed support is a plastic support or a rubber support.

15. The waterproof core column assembly according to claim 1, wherein the sealed support is a plastic support or a rubber support.

16. The waterproof core column assembly according to claim 1, wherein the sealed support is a plastic support or a rubber support.

* * * * *